United States Patent [19]

Shiga

[11] Patent Number: 4,549,103
[45] Date of Patent: * Oct. 22, 1985

[54] MULTI-PATH COOLING IN AN AC GENERATOR FOR A VEHICLE

[75] Inventor: Tsutomu Shiga, Aichi, Japan

[73] Assignee: Nippondenso Co. Ltd., Kariya, Japan

[*] Notice: The portion of the term of this patent subsequent to Nov. 29, 2000 has been disclaimed.

[21] Appl. No.: 546,190

[22] Filed: Oct. 27, 1983

Related U.S. Application Data

[63] Continuation of Ser. No. 358,901, Mar. 17, 1982, Pat. No. 4,418,295, which is a continuation of Ser. No. 194,603, Oct. 6, 1980.

[30] Foreign Application Priority Data

Oct. 9, 1979 [JP] Japan ............... 54-129429
Oct. 12, 1979 [JP] Japan ............... 54-131565

[51] Int. Cl.⁴ ............................................ H02K 9/00
[52] U.S. Cl. ........................... 310/60 R; 416/237; 417/353
[58] Field of Search ............... 310/50, 59, 60 R, 62, 310/63, 68 D, 68 R; 416/237, DIG. 3, 237; 417/353

[56] References Cited

U.S. PATENT DOCUMENTS

| | | |
|---|---|---|
| 1,668,462 | 5/1928 | Oswald . |
| 2,368,320 | 1/1945 | Norris ................ 416/237 |
| 2,429,903 | 10/1947 | Trickey ................ 172/36 |
| 2,508,144 | 5/1950 | Carville ................ 171/252 |
| 2,825,827 | 5/1958 | Luenberger ................ 310/60 |
| 2,852,711 | 9/1958 | Derner et al. ................ 310/269 |
| 3,184,625 | 5/1965 | Farison ................ 310/263 |
| 3,198,972 | 8/1965 | Larson ................ 310/68 |
| 3,267,312 | 8/1966 | Redick ................ 310/239 |
| 3,280,751 | 10/1966 | Ekey ................ 103/87 |
| 3,329,841 | 7/1967 | Binder et al. ................ 310/68 |
| 3,407,317 | 10/1968 | Honsinger ................ 310/58 |
| 3,422,339 | 1/1969 | Baker ................ 321/8 |
| 3,538,361 | 11/1970 | Hilterbrick et al. ................ 310/68 |
| 3,643,119 | 2/1972 | Lukens ................ 310/60 |
| 3,701,911 | 10/1972 | Hallerback ................ 310/60 |
| 3,751,699 | 8/1973 | Gleichman ................ 310/90 |
| 3,848,145 | 11/1974 | Goebel et al. ................ 310/60 |
| 4,103,193 | 7/1978 | Ito ................ 310/68 D |
| 4,162,419 | 7/1979 | DeAngelis ................ 310/266 |
| 4,169,282 | 9/1979 | Allport et al. ................ 363/145 |

FOREIGN PATENT DOCUMENTS

| | | |
|---|---|---|
| 540080 | 12/1931 | Fed. Rep. of Germany . |
| 1588432 | 5/1970 | Fed. Rep. of Germany . |
| 2757485 | 6/1978 | Fed. Rep. of Germany . |
| 977165 | 10/1965 | France . |
| 178211 | 12/1949 | Japan . |
| 5062005 | 10/1973 | Japan . |
| 5075003 | 11/1973 | Japan . |
| 51-15921 | 4/1976 | Japan . |
| 1398859 | 8/1972 | United Kingdom . |
| 2019109 | 4/1979 | United Kingdom . |

OTHER PUBLICATIONS

Abstract of published German application—G-MA–Heft 50, 75 26 047, dated Dec. 11, 1975, p. 2060.
"Specifications of Patents", 953,219 of Mar. 29, 1910, pp. 5676–5677.

Primary Examiner—Peter S. Wong
Assistant Examiner—D. L. Rebsch
Attorney, Agent, or Firm—Cushman, Darby & Cushman

[57] ABSTRACT

An AC generator for vehicles has a cooling fan secured to one end face of a rotor core, being operative to produce radial and axial flows of cooling air. The radial air flow passes across a stator coil and outwardly through air outlet openings formed in a peripheral wall portion of a housing. The axial air flow passes through spaces between respective fingers of rotor core and also through air gap between the rotor and stator, so that the rotor and stator coils are reliably cooled by the cooling fan. In an embodiment of the invention, an additional radial-flow fan is provided and mounted on the rotor in face-to-face contacting relationship with the other end face of the rotor core.

7 Claims, 9 Drawing Figures

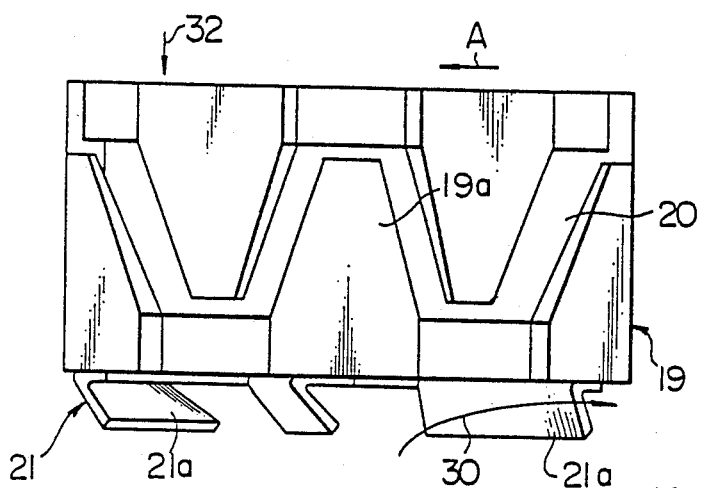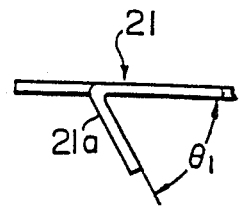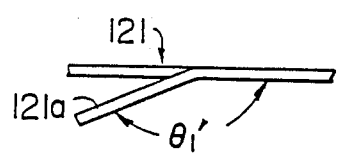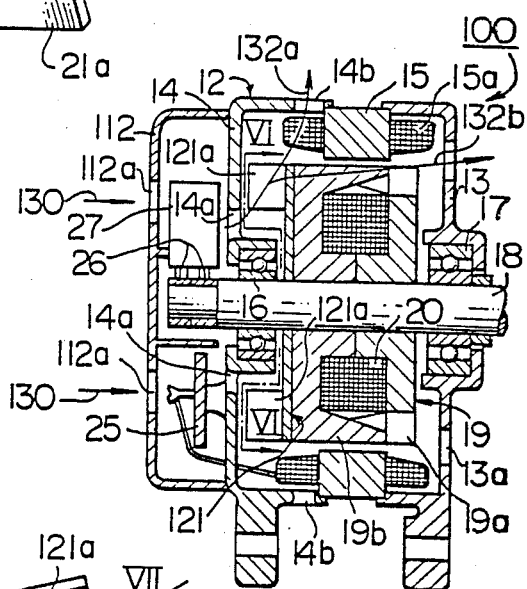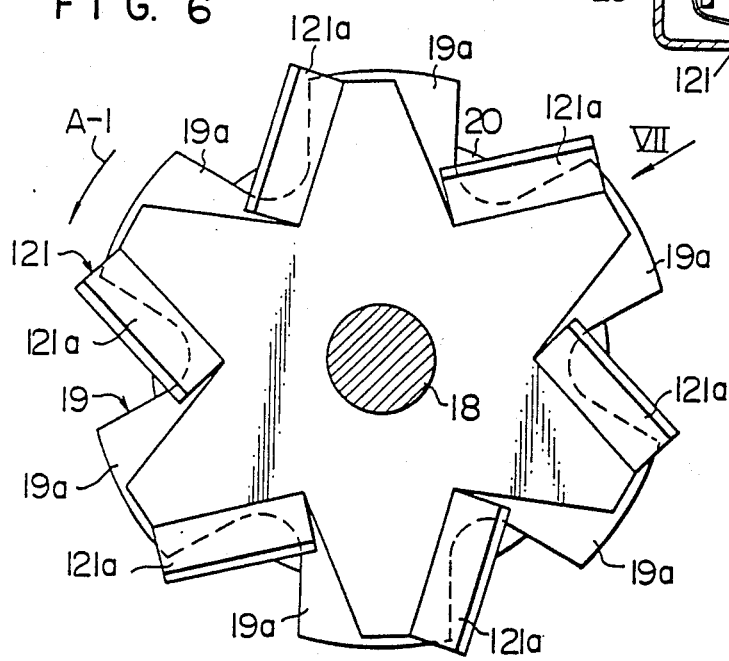

MULTI-PATH COOLING IN AN AC GENERATOR FOR A VEHICLE

This is a continuation, of application Ser. No. 358,901 (now U.S. Pat. No. 4,418,295), filed Mar. 17, 1982, which is a Continuation of Ser. No. 194,603, filed Oct. 6, 1980.

BACKGROUND OF THE INVENTION

1. Field of the Invention

The present invention relates to an AC generator to be installed on a vehicle such as automobile and, more particularly, to an improvement in the cooling mechanism of the generator.

2. Description of the Prior Art

In the conventional generator of the class specified above, a cooling fan is mounted on a rotor shaft and driven to produce a flow of cooling air which is introduced into the motor housing through air inlet openings in the rear end wall. The air then flows through spaces between respective fingers of the rotor core and also through the gap defined between the rotor core and the stator and is discharged out of the motor housing through air outlet openings formed in the front end wall of the housing.

As discussed, the prior art AC generator is so designed that the cooling air flows through the narrow air gap and through the spaces between the fingers of the rotor core. Thus, the resistance to the air flow is so high that the rate of the cooling air flow is not sufficient to surely and reliably cool the heat-generating components of the motor, such as the diode fins, stator coil and rotor coil, with a result that the performance of the generator is lowered.

As a solution to the problem pointed out above, a centrifugal or radial-flow fan can be mounted on one end face of the rotor core to produce a flow of air that passes across the stator coil. This solution, however, falls short of satisfactorily solving the problem in that the cooling air flow is not directed to the rotor coil and thus the rotor coil cannot be cooled.

SUMMARY OF THE INVENTION

It is an object of the present invention to make sure that, by making a simple modification in the conventional vehicular AC generator structure, cooling air can be directed to the stator coil and the rotor coil as well.

According to the present invention, there is provided an improved AC generator for vehicles comprising a housing including a generally cylindrical peripheral wall portion and end wall portions with openings formed therein, a stator assembly disposed in the housing and fixed to the cylindrical wall portion, a rotor assembly including a rotor shaft and a rotor core disposed radially inwardly of the stator assembly and fixed to the rotor shaft for rotation, the improvement comprising a cooling fan secured to one end face of the rotor core for rotation and including vanes equal in number to the fingers of the rotor core, the vanes being arranged such that the cooling fan when rotated with the rotor assembly blows air in both axial and radial directions, the stator assembly including a stator coil disposed substantially radially outwardly of the cooling fan, the housing being formed therein with air outlet openings disposed substantially radially outwardly of the stator coil.

The cooling fan provided in the AC generator according to the present invention is operative to direct axial and radial flows of cooling air to the rotor coil and stator coil, respectively, whereby the rotor and stator coils can both be reliably cooled.

The AC generator may be provided with an additional cooling fan which may comprise a centrifugal fan mounted on the other end face of the rotor core. In this instance, the motor housing may preferably be formed therein with additional air outlet openings disposed substantially radially outwardly of the centrifugal fan.

The above and other objects, features and advantages of the present invention will be made more apparent by the following description with reference to the accompanying drawings.

BRIEF DESCRIPTION OF THE DRAWINGS

FIG. 3 illustrates the rotor core and the cooling fan as viewed in the direction indicated by an arrow III in FIG. 2;

FIG. 4 is a fragmentary illustration of the cooling fan as viewed in the direction indicated by an arrow IV in FIG. 2;

FIG. 5 is a view similar to FIG. 1 but illustrates a second embodiment of the AC generator according to the present invention;

FIG. 6 is an enlarged sectional view of the rotor assembly and cooling fan of the second embodiment taken on line VI—VI in FIG. 5;

FIG. 7 is a fragmentary illustration of the cooling fan of the second embodiment as viewed in the direction indicated by an arrow VII in FIG. 6;

DESCRIPTION OF PREFERRED EMBODIMENTS

Figure 1:
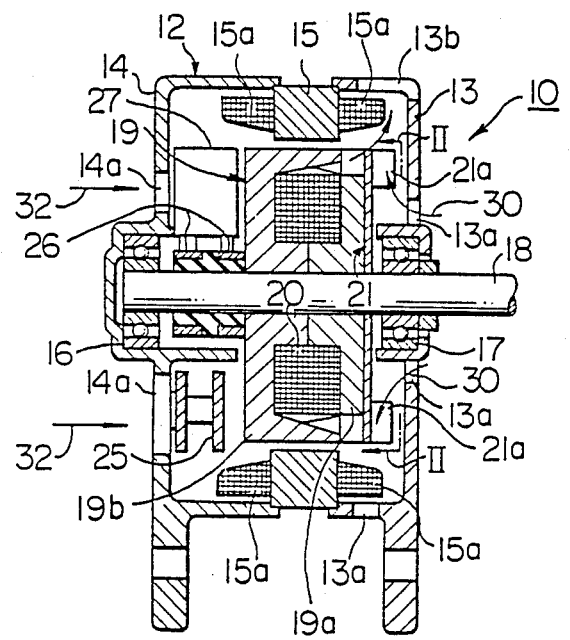
FIG. 1 is an axial sectional view of a first embodiment of the AC generator according to the present invention with a part being removed to simplify the illustration.

Referring to FIGS. 1 to 4 which illustrate a first embodiment 10 of a three phase AC generator according to the present invention, a housing 12 comprises a pair of cup-shaped parts 13 and 14 arranged in axially aligned and spaced relationship with each other. A stator core 15 is disposed in the housing 12 and secured to the inner edge portions of the opposed ends of the housing parts 13 and 14 to mechanically connect them together. The housing parts 13 and 14 constitute the end walls of the housing 12. The housing end walls support a pair of axially aligned bearings 16 and 17 which journal a rotor shaft 18. A plurality of air inlet openings 13a and 14a are formed in the housing end walls radially outwardly of the bearings 16 and 17.

Figure 2:
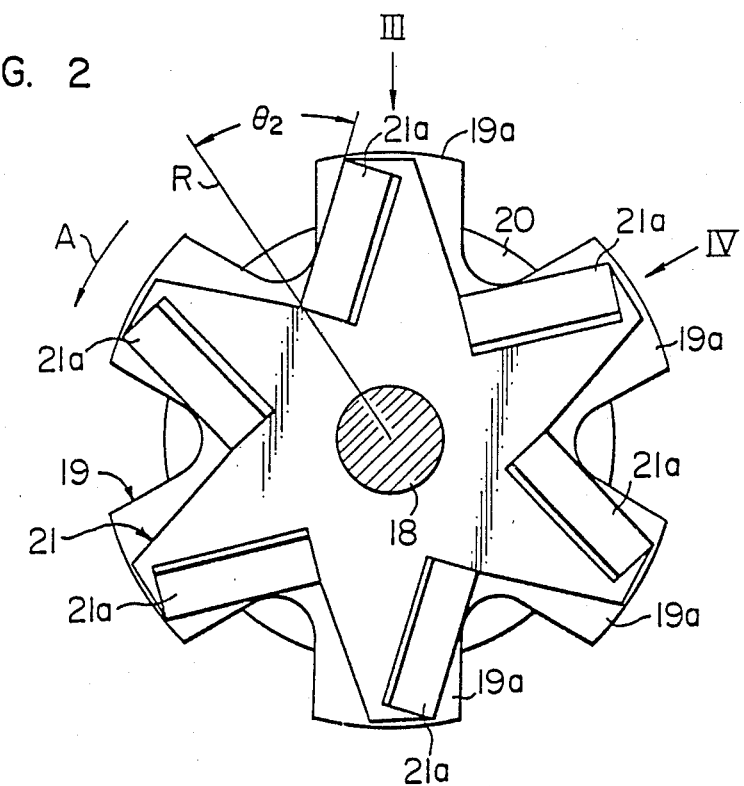
FIG. 2 is an enlarged sectional view of a rotor assembly and a cooling fan taken on line II—II in FIG. 1.

The rotor shaft 18 supports a rotor core 19 comprising a pair of interleaved pole members 19a and 19b and a rotor coil 20 wound around the rotor core. A cooling fan 21 is provided in face-to-face contacting relationship with one (right) end face of the rotor core 19 and fixed to the rotor shaft 18 by a conventional fixing means. The cooling fan 21 is formed of a sheet metal and has a plurality of vanes 21a equal in number to the fingers 19a of the rotor core 19. In the illustrated embodiment of the invention, the rotor core 19 has six fingers 19a. Thus, the cooling fan 21 is provided with six vanes 21a. The rotor core 19 and the cooling fan 21 are so arranged that the fingers 19a of the rotor core 19 are axially aligned with the vanes 21a, as best seen in FIG. 2, so as to reduce the resistance to the air flow through the spaces defined between respective rotor core fingers 19a and thus increase the air flow.

As will be seen in FIG. 4, each of the vanes 21a of the cooling fan 21 defines an angle $\theta_1$ with the flat major section of the fan. This angle may preferably be of a range from 30° to 80°. Thus, the cooling fan 21 acts as an axial-flow fan. The vanes 19a are inclined at angle $\theta_2$ relative to the radii, one of which is shown by R in FIG. 2. Thus, the cooling fan 21 also acts as a centrifugal fan. It will be apparent to those in the art that the cooling fan will act as a centrifugal fan even in the case where the angle $\theta_2$ is equal to zero ($\theta_2=0$).

The stator core 15 carries a stator coil 15a having a portion disposed substantially radially outwardly of the cooling fan 21. The housing part 13 includes a substantially cylindrical peripheral wall portion in which air outlet openings 13b are formed and positioned radially outwardly of the portion of the stator core 15 disposed radially outwardly of the fan 21, as will be seen in FIG. 1.

The other (left) end face of the rotor core 19 cooperates with the adjacent housing part 14 to define a space in which diode fins 25 are disposed and positioned adjacent to air inlet openings 14a. The diode fins 25 are supported by the housing part 14. Slip rings 26 are mounted in conventional manner on the rotor shaft 18 between the left end face of the rotor core 19 and the bearing 16. A brush unit 27 is disposed in the space between the left end face of the rotor core 19 and the housing part 14 and operatively associated with the slip rings 26 in conventional manner.

In operation, when the rotor core 19 is rotated with the cooling fan 21 in a direction indicated by an arrow A in FIGS. 2 and 3, the vanes 21a of the fan 21 are operative to induce flows of air through the air inlet openings 13a and 14a, as shown by arrows 30 and 32. Of these air flows, the air flow shown by the arrow 30 is operative to first cool the bearing 17 and then passes through the spaces between respective vanes 21a of the fan 21 and, thereafter, passes across the stator coil 15a to cool the same. On the other hand, the air flow indicated by the arrow 32 is operative to cool the bearing 16 and the diode fins 25 and then passes axially through the spaces defined between respective fingers 19a of the rotor core 19 and through the air gap between the rotor core 19 and the stator core 15 to the fan 21 and, thereafter, passes across the stator coil 15a. The two air flows 30 and 32 then pass through the air outlet openings 13b formed in the housing part 13.

As described, the AC generator 10 is provided with a cooling fan 21 which can be called a "composite fan" and is operative not only to produce an axial air flow for cooling the rotor coil 20 but also to produce a radially outward air flow for cooling the stator coil 15a as well to assure that the temperature rise of the rotor and stator coils is reliably suppressed, with a resultant advantageous increase in the output of the generator.

A second embodiment 100 of the present invention will be described with reference to FIGS. 5–7 wherein parts similar to those of the first embodiment are designated by similar reference numerals. The difference only will be described hereunder. The cooling fan 21 of the first embodiment 10 is disposed in face-to-face contacting relationship with the right end face of the rotor core 19. However, the second embodiment 100 has a cooling fan 121 disposed in face-to-face contacting relationship with the left end face of the rotor core 19 and being operative to blow air rightwards into the spaces between fingers of the core 19 and also into the air gap between the rotor and stator cores. For this purpose, therefore, the cooling fan 121 has vanes 121a each of which defines with the flat major part of the fan an angle $\theta_1$, which is greater than 90° and preferably from 100° to 150°.

The housing 12 is provided with air outlet openings 14b which are formed not in the housing part 13 but in the other housing part 14 and are disposed generally radially outwardly of the cooling fan 121. In addition, the housing 12 further includes an additional cup-shaped housing cover 112 secured to the outer end of the housing part 14. Thus, the housing cover 112 acts as an end wall of the housing 12 while the housing part 14 acts as a radial wall or partition which supports the bearing 16. The partition 14 and the end wall 112 define therebetween a space into which a left end of the rotor shaft 18 extends through the bearing 16. The slip rings 26 are mounted on the left end portion of the rotor shaft 18 and are operatively associated with the contact unit 27 which is disposed between the walls 112 and 14. A diode fin 25 is also disposed between these walls 112 and 14 and carried by the wall 14. The end wall 112 is formed therein with air inlet openings 112a. The openings 14a in the partition 14 act as air passages.

The embodiment 100 of the AC generator according to the present invention operates as follows:

When the cooling fan 121 is rotated in a direction indicated by an arrow A-1 in FIG. 6, cooling air is sucked into the housing 12 through air inlet openings 112a in the end wall 112 of the housing, as indicated by arrows 130 in FIG. 5, to cool the diode fin 25. The air then flows through the air passages 14a in the radial wall 14 to the vanes 121a of the cooling fan 121. This fan 121 acts as both an axial flow fan and a centrifugal fan as in the first embodiment 10. Thus, the air flow which has reached the fan 121 is divided by the vanes 121a into two currents 132a and 132b one (132a) of which passes radially outwardly across the stator coil 15a and through the air outlet openings 14b so that the stator coil 15a is cooled. The other air current 132b passes axially through the spaces defined between respective fingers of the rotor core 19 and through the air gap between the rotor core 19 and the stator core 15 and is discharged from the housing 12 through the openings 13a in the housing part 13, as indicated by an arrow 132b in FIG. 5, whereby the rotor coil 20 is cooled.

Figure 8:
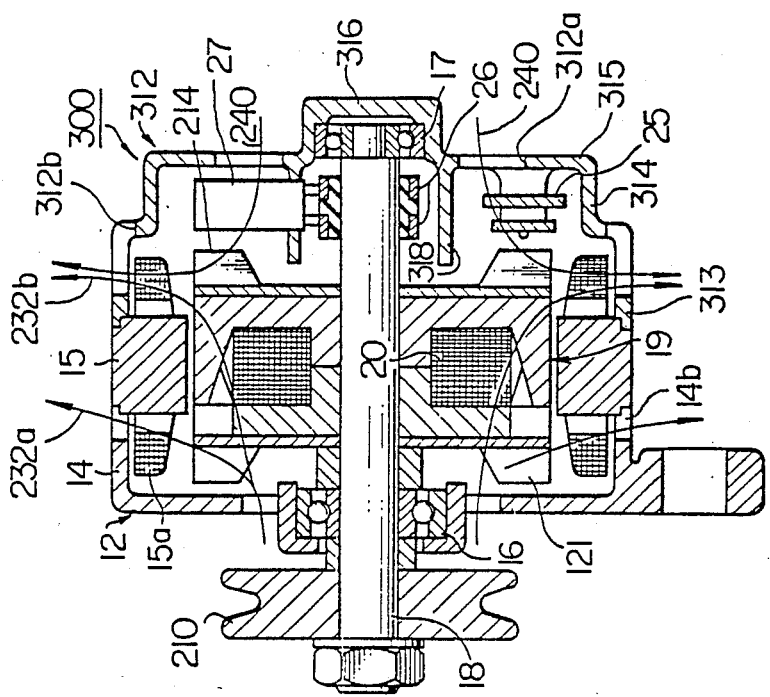
FIG. 8 is a view similar to FIGS. 1 and 5 but illustrates a third embodiment of the AC generator according to the present invention.

A third embodiment 200 of the AC generator according to the present invention is illustrated in FIG. 8 wherein parts similar to those in the preceding embodiments 10 and 100 of the invention are designated by similar reference numerals. The difference only will be described below. The rotor shaft 18 extends axially outwardly through both bearings 16 and 17 which are supported by housing parts 13 and 14, respectively. One end of the rotor shaft 18, which extends beyond the bearing 16, carries a pulley 210 mounted thereon for rotation. The other end of the rotor shaft 18 extends into a space defined between the housing part 13 and an additional cup-shaped housing part 212 secured to the housing part 13 coaxially. The slip rings 26 are mounted on the other end of the rotor shaft 18 for rotation. The brush unit 27 is disposed in the space between the housing parts 13 and 212 and operatively associated with the slip rings 26, as in the preceding embodiments of the invention. The housing part 212 acts as an end wall of the housing 12 and is provided with air inlet openings 212a. The housing part 13 acts as a radial wall or partition with air passages 13a formed therein. A diode fin 25 is mounted on the partition 34 and disposed in the path of air flow from the openings 212a through the passages 13a into the space defined by the two housing parts 13 and 14, as will be discussed in more detail later.

The AC generator 200 is provided with two cooling fans 121 and 214. The cooling fan 121 is similar to the cooling fan shown in FIG. 5 and is secured to the left end face of the rotor core 19 and acts as axial-flow and radial-flow fan, as discussed in connection with FIG. 5, whereas the other cooling fan 214 is a conventional centrifugal fan and is secured to the right end face of the rotor core 19. The housing part 13 defines air outlet openings 13b disposed radially outwardly of the centrifugal fan 214. A part of the stator coil 15a is disposed between the centrifugal fan 214 and the air outlet openings 13b. The housing part 14 also defines air outlet openings 14b disposed radially outwardly of the cooling fan 121. The other part of the stator coil 15a is disposed between the fan 121 and the air outlet openings 14b.

In operation, the vanes 121a of the axial-flow and centrifugal fan 121 are operative to induce air flow which passes through the air inlet opening 14a into the housing. The air flow is divided into two currents one of which is directed radially outwardly and passes across the stator coil 15a and is discharged through the air outlet openings 14b, as indicated by arrows 232a shown in FIG. 8. The other air current passes substantially axially through the spaces defined between respective fingers of the rotor core 19 and also through the air gap defined between the rotor and stator cores 19 and 15. The axial air current is then directed radially outwardly and passes across the stator coil 15a and is discharged through the air outlet openings 13b, as indicated by arrows 232b in FIG. 8. The centrifugal fan 214 is operative to produce an air flow through the air inlet openings 212a and through the air passages 13a, as indicated by arrows 240 in FIG. 8. The air then flows through respective vanes of the centrifugal fan 214 and is forced radially outwardly across the stator coil 15a and discharged through the air outlet openings 13b. Thus, it will be appreciated that the rotor and stator coils 20 and 15a, the diode fin 25 and the bearings are efficiently cooled by the operations of the cooling fans 121 and 214. It is further to be noted that the components of the AC generator are arranged such that the component parts of the generator which are subjected to higher temperatures, i.e., the rotor and stator coils, are disposed in the paths of the cooling air flows downstream of the generator component parts which are subjected to relatively lower temperatures, i.e., the bearings and the diode fin.

Figure 9:
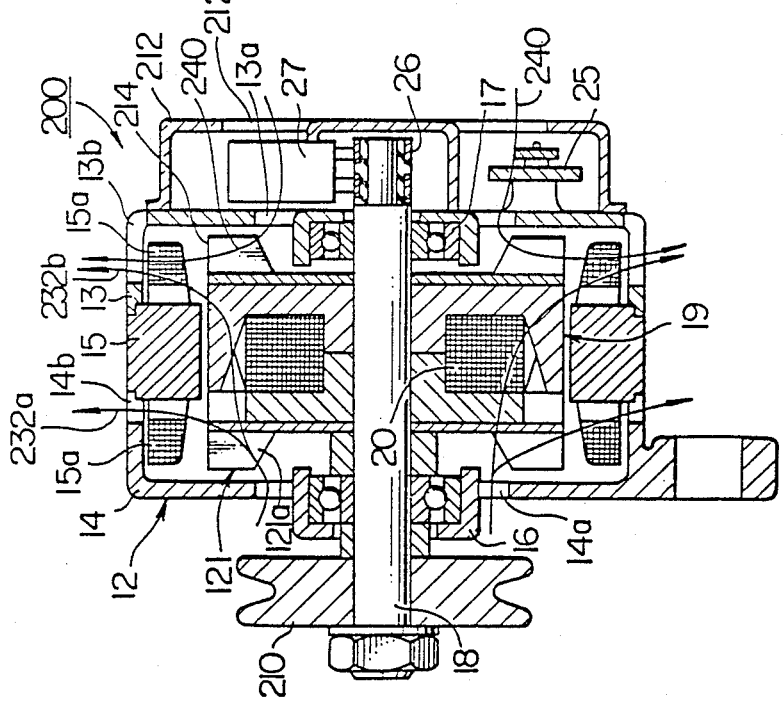
FIG. 9 is a view similar to FIGS. 1, 5 and 8 but illustrates a fourth embodiment of the AC generator according to the present invention.

FIG. 9 illustrates a fourth embodiment of the invention generally designated by reference numeral 300. The embodiment 300 is similar to the embodiment 200 except the following points:

The housing parts 13 and 212 of the embodiment 200 are replaced by a single housing part 312 which includes a first cylindrical section 313 having an outer diameter equal to that of the stator core 15 and secured at one end thereto, a second cylindrical section 314 integrally connected at one end to the other end of the first cylindrical section 313 and having an outer diameter smaller than that of the first section 313, an end wall section 315 integrally connected to the other end of the second cylindrical section 314 and a central projection 316 which defines therein a recess into which the bearing 17 is firmly fitted. The end wall section 315 is formed therein with air inlet openings 312a adjacent to the central projection 316. The first section 313 is formed therein with air outlet openings 312b disposed radially outwardly of the stator coil 15a. The slip rings 26 are mounted on the rotor shaft 18 between the bearing 17 and the centrifugal fan 214. The brush unit 27 is operatively associated with the slip rings 26 and are supported from the end wall section 315 by means of a generally cylindrical part 318 axially inwardly extending from the end wall section 315.

The operation of the embodiment 300 of the present invention is substantially similar to the operation of the embodiment 200 with the exception that the cooling air flow produced by the centrifugal fan 214 passes first over the bearing-holding projection 316 to cool the bearing 17 therein and then passes across the diode fin 25 to cool them.

What is claimed is:
1. An AC generator for vehicles comprising:
a housing including a generally cylindrical peripheral wall portion extending between end wall portions, each of said end wall portions having formed therein openings for air passage;
a stator assembly disposed within said housing and fixed to said cylindrical wall portion at a location between first and second spaced air outlet openings in the cylindrical wall said stator assembly in spaced relationship therewith, the rotor assembly including a rotor shaft, a rotor coil, and a rotor core carrying said rotor coil, said rotor core being fixed to the rotor shaft for rotation therewith and comprising interleaved pole members which define a plurality of angularly separated fingers having therebetween axially entending spaces;
a first cooling fan secured to one end of said rotor core for rotation therewith, said fan including a plurality of vanes obliquely extending at an angle greater than 90 degrees with respect to the surface of said one end of the rotor core, the vanes being disposed in overlapping relationship with one side portion of said stator coil and in substantially axial alignment with the spaces between said fingers, whereby during rotation of the rotor core, the fan draws air through the openings in one of said end wall portions and directs the air (1) radially of the housing past said stator assembly and through the first air outlet opening in the cylindrical wall portion and (2) axially of the housing through the spaces between the rotor core fingers, and between the rotor and stator assemblies; and
a second cooling fan secured to the other end of said rotor core for rotation therewith and including a plurality of vanes disposed in overlapping relationship with the other side portion of said stator coil and arranged such that, during rotation of the rotor core, the second fan draws air through the openings in the other of said end wall portions and directs this air, as well as that air axially directed by the first cooling fan through the spaces between the rotor core fingers and between the rotor and stator assemblies, substantially only radially of the housing past said stator assembly and through the second air outlet opening in the cylindrical wall portion.

2. An AC generator according to claim 1, wherein said stator coil at least partially overlaps said air outlet openings.

3. An AC generator according to claim 1, wherein the vanes of said first cooling fan extend at an angle in the range of 100 degrees to 150 degrees with respect to the surface of said one end of the rotor core and are equal in number to the fingers of the rotor core.

4. An AC generator according to claim 2, wherein the vanes of said first cooling fan extend at an angle in the range of 100 degrees to 150 degrees with respect to the surface of said one end of the rotor core and are equal in number to the fingers of the rotor core.

5. An AC generator according to claim 1, wherein said second cooling fan comprises a radial-flow fan.

6. An AC generator for vehicles comprising:

a housing including a generally cylindrical peripheral wall portion extending between end wall portions, each of said end wall portions having formed therein openings for air passage;

a stator assembly disposed within said housing and fixed to said cylindrical wall portion at a location between first and second spaced air outlet openings in the cylindrical wall portion, said stator assembly including a stator coil which at least partially overlaps said air outlet openings;

a rotor assembly disposed radially inwardly of said stator assembly in spaced relationship therewith, the rotor assembly including a rotor shaft, a rotor coil, and a rotor core carrying said rotor coil, said rotor core being fixed to the rotor shaft for rotation therewith and comprising inter-leaved pole members which define a plurality of angularly separated fingers having therebetween axially extending spaces;

bearings for journaling said rotor shaft within the housing;

a first cooling fan secured to one end of said rotor core for rotation therewith, said fan including a substantially flat section disposed around said rotor shaft in contacting face-to-face relationship with said one end of the rotor core and a plurality of vanes integral with the flat section, said vanes obliquely extending from the surface of said flat section at an angle predetermined to provide both radial and axial flows of air in said housing and being arranged in overlapping relationship with one side portion of said stator coil, whereby during rotation of the rotor core, the fan provides (1) the radial flow of air from the openings in one of said end wall portions to the first air outlet opening in the cylindrical wall portion through said stator assembly and (2) the axial flow of air through the spaces between the rotor core fingers, and between the rotor and stator assemblies; and a second cooling fan secured to the other end of said rotor core for rotation therewith, said second cooling fan including a substantially flat section disposed around said rotor shaft in contacting face-to-face relationship with said other end of the core and a plurality of vanes integral with the flat section and arranged in overlapping relationship with the other side portion of said stator coil, whereby during rotation of the rotor core, the second fan provides a flow of air, which is substantially radial only, from the openings in the other of said end wall portions through said stator assembly to the second air outlet opening in the cylindrical wall portion.

7. An AC generator according to claim 6, wherein the vanes of said first cooling fan are equal in number to the fingers of the rotor core.

* * * * *